United States Patent
Schlipf et al.

(10) Patent No.: US 12,441,459 B2
(45) Date of Patent: Oct. 14, 2025

(54) WING FOR AN AIRCRAFT INCLUDING A HIGH LIFT BODY TRACK WITH ROLLER UNIT

(71) Applicant: Airbus Operations GmbH, Hamburg (DE)

(72) Inventors: Bernhard Schlipf, Hamburg (DE); Florian Lorenz, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/586,647

(22) Filed: Feb. 26, 2024

(65) Prior Publication Data
US 2024/0286731 A1    Aug. 29, 2024

(30) Foreign Application Priority Data
Feb. 28, 2023   (EP) ..................... 23159086

(51) Int. Cl.
*B64C 9/02*    (2006.01)
*B64C 9/18*    (2006.01)

(52) U.S. Cl.
CPC . *B64C 9/02* (2013.01); *B64C 9/18* (2013.01)

(58) Field of Classification Search
CPC .... B64C 9/02; B64C 9/18; B64C 9/22; B64C 9/24
See application file for complete search history.

(56) References Cited

U.S. PATENT DOCUMENTS

| | | | | |
|---|---|---|---|---|
| 2,405,726 A | * | 8/1946 | Zap | B64C 9/16 244/216 |
| 5,839,699 A | | 11/1998 | Bliesner | |
| 11,807,365 B2 | * | 11/2023 | Krey | B64C 9/02 |
| 2011/0220762 A1 | | 9/2011 | Gyuricsko et al. | |
| 2011/0253832 A1 | * | 10/2011 | Wildman | B64C 9/02 74/89.32 |
| 2022/0081100 A1 | | 3/2022 | Schlipf et al. | |

FOREIGN PATENT DOCUMENTS

WO    2018197649 A1    11/2018

OTHER PUBLICATIONS

European Search Report for corresponding European Patent Application No. 23159086 dated Aug. 10, 2023.

* cited by examiner

*Primary Examiner* — Troy Chambers
*Assistant Examiner* — Shanna Danielle Glover
(74) *Attorney, Agent, or Firm* — Greer, Burns & Crain, Ltd.

(57) ABSTRACT

A wing having a main wing and a high lift assembly with a body and a connection. The connection movably connects the body to the main wing, such that the body is movable between a retracted position and at least one extended position. The connection comprises a track extending along a longitudinal axis between a first end and a second end and an intermediate portion between the ends. The first end and/or the intermediate portion is mounted to body, and the second end and/or the intermediate portion is mounted to the main wing by a roller bearing such that the track is movable along the longitudinal axis. The roller bearing has a roller unit mounted to the main wing and engaging a surface provided at the track so that the roller unit can adapt its tilt position with respect to the surface.

10 Claims, 5 Drawing Sheets

WING FOR AN AIRCRAFT INCLUDING A HIGH LIFT BODY TRACK WITH ROLLER UNIT

CROSS-REFERENCES TO RELATED APPLICATIONS

This application claims the benefit of European Patent Application Number 23 159 086.0 filed on Feb. 28, 2023, the entire disclosure of which is incorporated herein by way of reference.

FIELD OF THE INVENTION

The present invention relates to a wing for an aircraft, a high lift assembly and a cardanic frame assembly associated with said wing, and an aircraft comprising said wing.

BACKGROUND OF THE INVENTION

The described wing for an aircraft comprises a main wing and a high lift assembly, the high lift assembly comprising a high lift body and a connection assembly movably connecting the high lift body to the main wing such that the high lift body is movable between a retracted position and at least one extended position (e.g., movable relative to the main wing). The high lift body may be or comprise a leading edge slat or a trailing edge flap of a wing for an aircraft.

The connection assembly comprises an elongate track that extends along a track longitudinal axis between a first end and a second end and has an intermediate portion between the first and second ends. At least one, or both, of the first end and the intermediate portion of the elongate track is/are mounted to the high lift body.

The first end may correspond to a front end of the connection assembly, e.g., the end positioned towards the intended direction of forward motion of the wing during flight of an aircraft. Alternatively, the first end may correspond to a rear end of the connection assembly, e.g., the end positioned aware from the intended direction of forward motion of the wind during flight of an aircraft. Where the high lift body is or comprises a leading edge slat, then the first end may correspond to the front end of the connection assembly. Where the high lift body is or comprises a trailing edge flap, then the first end may correspond to the rear end of the connection assembly.

The first end of the elongate track may be preferably mounted to either a leading edge slat, or to a trailing edge flap by any appropriate means, e.g., by a spherical bearing or bearings. The second end of the elongate track may be preferably mounted to the main wing by a roller bearing, as will be described, such that the elongate track and either the leading edge slat or the trailing edge flap are moveable relative to the main wing. The elongate track may take the form of, for example, a C-shape, such that its surface lies opposite the circumferential surface of the roller bearing, wherein the distance between an upper surface and a lower surface of the elongate track is larger than a diameter of a roller bearing, such that the roller bearing may engage only one of the upper surface or the lower surface of the elongate track at any one time, i.e., the distance between the upper and lower surfaces of the elongate track is selected such that a clearance is provided between the roller bearing and either the upper surface or the lower surface of the elongate track, such that the roller bearing cannot engage with the upper and lower surfaces of the elongate track at the same time, thereby becoming wedged therein.

At least one of the second end and the intermediate portion of the track is mounted to the main wing by a roller bearing such that the track is movable along the track longitudinal axis, for example along a predefined path e.g., on the track longitudinal axis, such as between a stowed position which the high lift body is in the retracted position and a deployed position when the high lift body is in one of the at least one extended positions. The roller bearing comprises at least one roller unit that is mounted to the main wing and that engages an engagement surface provided on the elongate track. Preferably the roller unit engages the intermediate portion or the second end of the elongate track. The roller unit may be mounted to the main wing in any appropriate way, for example may be fixed or fastened to the main wing, for example may be bolted to the main wing.

Wings for aircraft having connection assemblies that movably connect a high lift body to the main wing are known to comprise roller bearings. However, small misalignments between the roller bearing and the corresponding bearing surface may have the effect of inducing large load concentrations acting both on the bearings and the bearing surface. This can cause excessive wear to the bearings and bearing surface, thereby shortening their lifespan. There is therefore a need in the art to provide reduced or remove stress concentrations in the components between a main wing of an aircraft and a high lift body in a simple and low maintenance manner.

SUMMARY OF THE INVENTION

Therefore, an object of the present invention is to provide a non-complex, lightweight and low maintenance design of a main wing and associated high lift body and connection assembly.

The object may be achieved in that the roller unit is mounted to the main wing in a cardanic way, e.g., is cardanically mounted to the main wing, e.g., is mounted to the main wing so as to be or define a universal joint. The roller unit is mounted to the main wing such that the roller unit is able to adapt its position with respect to the position of the engagement surface, e.g., when engaging the engagement surface. The roller unit may be mounted to the main wing such that it is able to adapt its tilt position with respect to the engagement surface (e.g., the angle of the roller axis relative to the engagement surface), for example as a result of the cardanic way in which the roller unit is mounted to the main wing.

According to a preferred embodiment, the roller unit may engage the main wing via a frame assembly, which may be in the form of a cardanic frame assembly, for example which may comprise or define a universal joint. The frame assembly may comprise at least one frame member which is mounted to a roller unit so as to permit rotation between the frame assembly and the roller unit, for example in two axes or in at least two axes.

According to a preferred embodiment, the frame assembly may comprise a first frame and a second frame. The first frame may be considered to be an outer frame, while the second frame may be considered to be an inner frame. The first frame may permit rotation of the roller unit relative to the frame assembly in a first axis, and the second frame may permit rotation of the roller unit relative to the frame assembly in a second axis. One of the first and second axes may be a longitudinal axis of the roller unit (e.g., where the roller unit is cylindrical in shape), and optionally one of the first and second axes may be perpendicular to a longitudinal axis of the roller unit.

In a preferred embodiment, the first frame may be mounted to the main wing. For example, the first frame may be fixedly mounted to the main wing. The first frame may be mounted to the main wing in any appropriate way, for example it may be bolted, chemically bonded, welded, or the like, to the main wing. The roller unit may be mounted to the second frame so as to be rotatable about a roller rotation axis. The roller rotation axis may be the or an axis about which the roller is configured to rotate, which may vary depending on the geometry of the roller unit. In the where the roller unit has, for example, a cylindrical or truncated cone shape, then the roller rotation axis may be the longitudinal axis of the roller unit.

The second frame may be mounted to the first frame so as to be rotatable about a frame rotation axis. The frame rotation axis may extend perpendicular to the roller rotation axis. The frame rotation axis may extend parallel to the track longitudinal axis. Both the frame rotation axis and the roller rotation axes may extend substantially perpendicular to the normal extending from the point of contact between the roller bearing and the elongate track.

The roller unit may comprise at least one first shaft which may be mounted, e.g. fixedly mounted, to either the roller unit in this case being rotatably supported by the second frame, or is mounted, e.g., fixedly mounted, to the second frame and is rotatably supported by the roller unit. Additionally or alternatively, a second shaft forming the frame rotation axis may be mounted (e.g., fixedly mounted) to the second frame and rotatably supported by the first frame, or may be mounted (e.g., fixedly mounted) to the first frame and rotatably supported by the second frame.

In one embodiment, the first frame and/or the second frame may be formed as a housing around the roller unit. The housing may have at least one opening, such that the roller unit may extend through the opening (e.g., may extend partially through the opening) to permit a roller surface of the roller unit to engage with the engagement surface of the elongated track in (e.g., adjacent, proximate, or the like) the area of the opening.

The elongated track may have a profile comprising an upper flange portion, a lower flange portion and at least one web portion connecting upper and lower flange portions. The roller unit may be arranged in a recess located between the upper and lower flange portions and may engage the engagement surface provided at the upper flange portion and/or at the lower flange portion.

The housing may comprise an upper opening at its upper side and a lower opening at its lower side. The roller unit may extend through the upper opening and/or the lower opening, so that a roller surface of the roller unit may engage with the engagement surface provided on the upper flange portion and/or on the lower flange portion of the track in the area of (e.g., adjacent to, proximate to, or the like) the upper opening and/or the lower opening.

The housing may be fitted at least partly in the recess between upper and lower flange portions.

In a preferred embodiment, the roller unit may be a first roller unit, and the roller bearing may the first roller unit and a second roller unit spaced from the first roller unit along the track longitudinal axis. The first roller may be located at the second end of the elongated track, and the second roller may be located in the intermediate portion of the elongated track.

The track has may have a profile such that a first recess is formed between the upper and lower flange portions at a first side of the web portion, and a second recess is formed between the upper and lower flange portions at a second side of the web portion opposite the first side. Such a profile may take the form of an I, Π, double-C, or double-T profile, thus providing the desired first and second recesses.

The roller unit may comprise a first roller element and a second roller element. The first roller element may be arranged in the first recess and the second roller element may be arranged in the second recess. Preferably, the first and second roller elements may be arranged coaxially and may have the same radius.

The second roller unit may comprise a third roller element and a fourth roller element. The third roller element may be arranged in the first recess and the fourth roller element may be arranged in the second recess. Preferably, the third and fourth roller elements may be arranged coaxially, and may have the same radius.

The connection assembly may be considered a first connection assembly, and wherein the wing may comprise a second connection assembly which may connect the high lift body to the main wing in a position spaced apart from the first connection assembly in the direction of the span of the wing, and wherein the second connection assembly may be formed as the first connection assembly, i.e., with the same or substantially the same geometry and construction as the first connection assembly.

A further aspect of the present invention relates to a high lift assembly as has been described in the preceding paragraphs in relation to the wing. The high lift assembly may be in the form of a leading edge high lift assembly, or may be in the form of a trailing edge high lift assembly.

The high lift assembly comprises a high lift body, e.g., a leading edge slat or a trailing edge flap, and a connection assembly configured for movably connecting the high lift body to the main wing, such that the high lift body is movable relative to the main wing, such as between a retracted position and at least one extended position. The connection assembly comprises an elongate track that extends along a track longitudinal axis between a first end and a second end and has an intermediate portion between the first and second ends. As previously described in reference to the first aspect, the first end may correspond to a front end of the connection assembly (in which case the rear end would correspond to the second end, as is also the case with the first described aspect) or the first end may correspond to a rear end of the connection assembly (in which case the front end would correspond to the second end, as is also the case with the first described aspect).

According to the second aspect, the first end and/or the intermediate portion of the track is mounted to the high lift body, and the second end and/or the intermediate portion of the track is configured to be mounted to the main wing by a roller bearing, such that the track is movable along the track longitudinal axis. For example, the track may be moveable along a predefined path, e.g., a predefined path on the track longitudinal axis, such as between a stowed position when the high lift body is in the retracted position, and a deployed position when the high lift body is in the extended position.

Further according to the second aspect, the roller bearing comprises at least one roller unit that is configured to be mounted to the main wing and that is configured to engage an engagement surface provided on the track, for example on the intermediate portion and/or the second end of the elongate track. The roller unit is configured to be mounted to the main wing in a cardanic way, so that the roller unit can adapt its tilt position with respect to the engagement surface, such as when engaging the engagement surface. The features and advantages mentioned in connection with the wing also apply to the high lift assembly that can be used in such a wing.

Yet a further aspect relates to a cardanic frame assembly for the wing for an aircraft as has been previously described, or for the high lift assembly as has also been previously described.

The cardanic frame assembly comprises a roller unit, a first frame, and a second frame. The first frame may be considered to be an outer frame, while the second frame may be considered to be a inner frame. The first frame is configured to be mounted to a main wing, for example fixedly mounted to the main wing, and the roller unit is mounted to the second frame and is rotatable about a roller rotation axis. The second frame is mounted to the first frame rotatable about a frame rotation axis extending perpendicular to the roller rotation axis. The frame rotation axis may be parallel to the track longitudinal axis.

Another aspect relates to an aircraft comprising a wing for an aircraft as described in any of the previous paragraphs, comprising a high lift assembly as described previously, and/or comprising a cardanic frame assembly as previously described.

DETAILED DESCRIPTION OF THE PREFERRED EMBODIMENT

Figure 1:
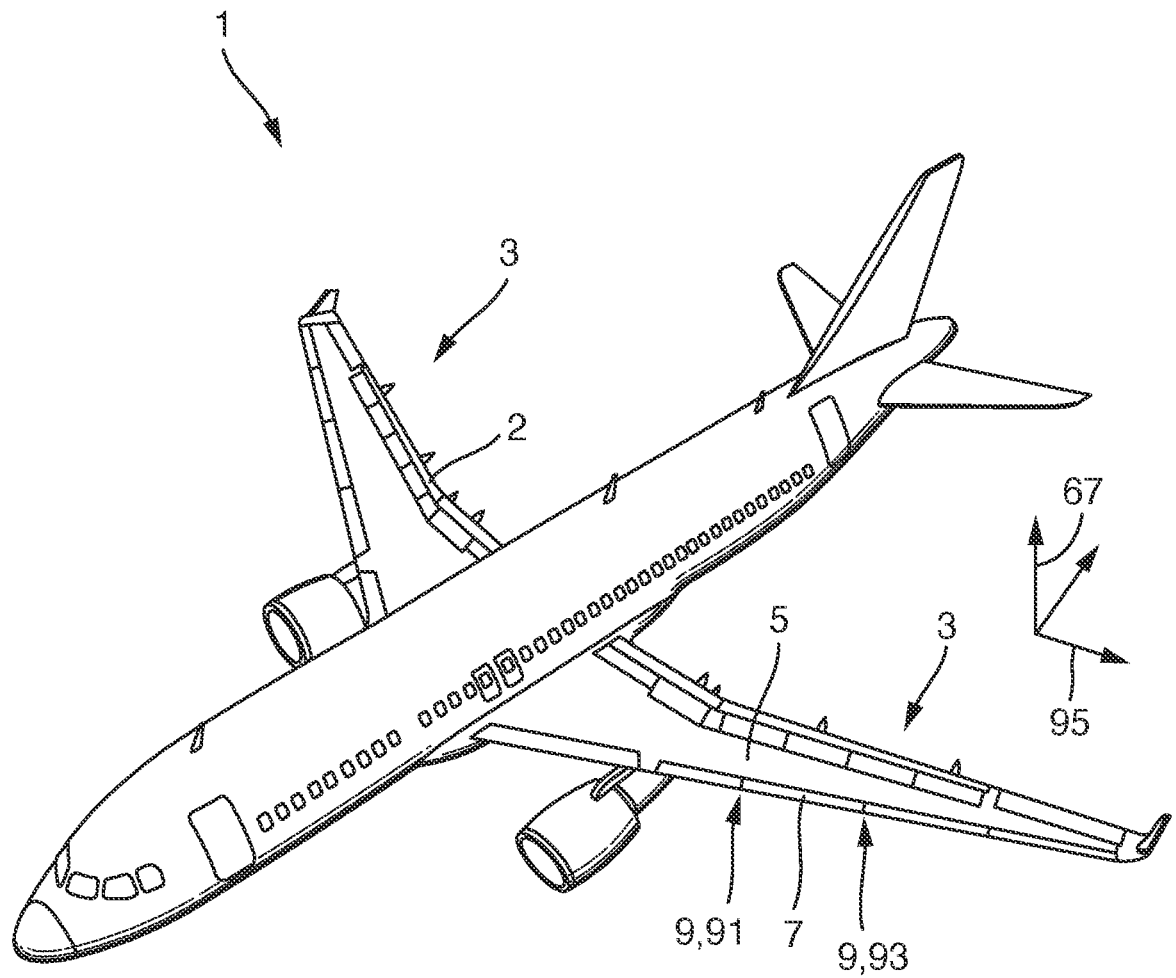
FIG. 1 is a perspective view of an aircraft, showing a wing of the aircraft that may be used in accordance with the present invention.

In FIG. 1 an aircraft 1 according to an embodiment of the present invention is illustrated. The aircraft 1 comprises a wing 3 that is formed according to an embodiment of the present invention.

As shown in FIG. 1, the connection assembly 9 relates to a first connection assembly 91, and the wing 3 comprises a second connection assembly 93 connecting the slat 7 to the main wing 5 in a position spaced apart from the first connection assembly 91 in a wing span direction 95, and wherein the second connection assembly 93 is formed as the first connection assembly 91. Additionally illustrated in FIG. 1 is a wing thickness direction 67. While, in FIG. 1, the connection assembly 9 is illustrated as connecting slat 7 to the main wing 5, it should also be understood that the connection assembly 9 may be used to connect a trailing edge flap 2 to the wing 5 of an aircraft.

Figure 2:
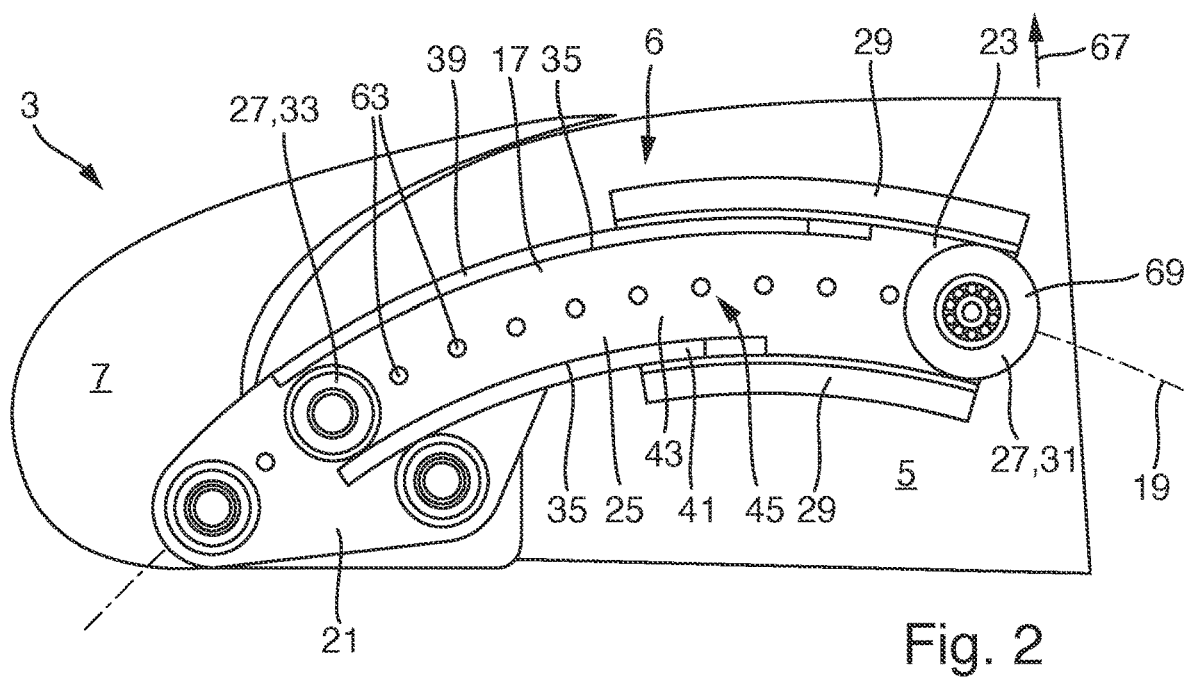
FIG. 2 is a side view of connection assembly in an aircraft wing according to the prior art.

FIG. 2 shows a connection assembly 6 of a wing for an aircraft according to the prior art, which is configured to connect a slat to the main wing of an aircraft. The connection assembly 6 may be used in combination with a wing 1 similar to that as described in FIG. 1, where the wing 1 comprises a main wing 5, a slat 7, and a connection assembly 9 (according to the present disclosure) movably connecting the slat 7 to the main wing 5, such that the slat 7 is movable between a retracted position and at least one extended position. For simplicity, reference numerals 3, 5 and 7 relating to the wing of FIG. 1 shall be used also in relation to the prior art connection assembly 6.

Figure 3:
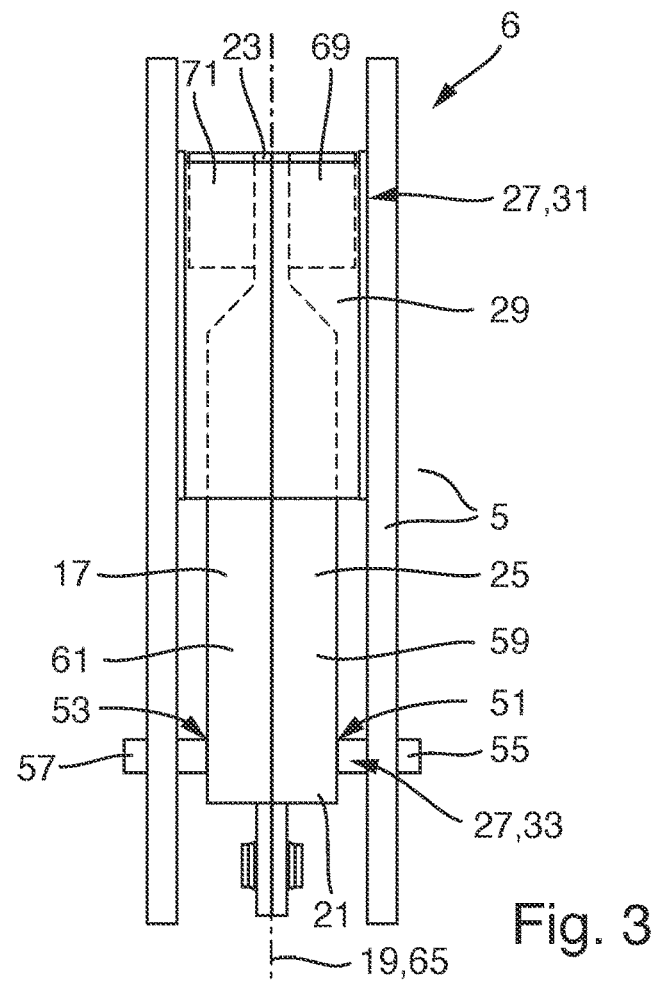
FIG. 3 is a top view of the connection assembly of FIG. 2.
Figure 4:
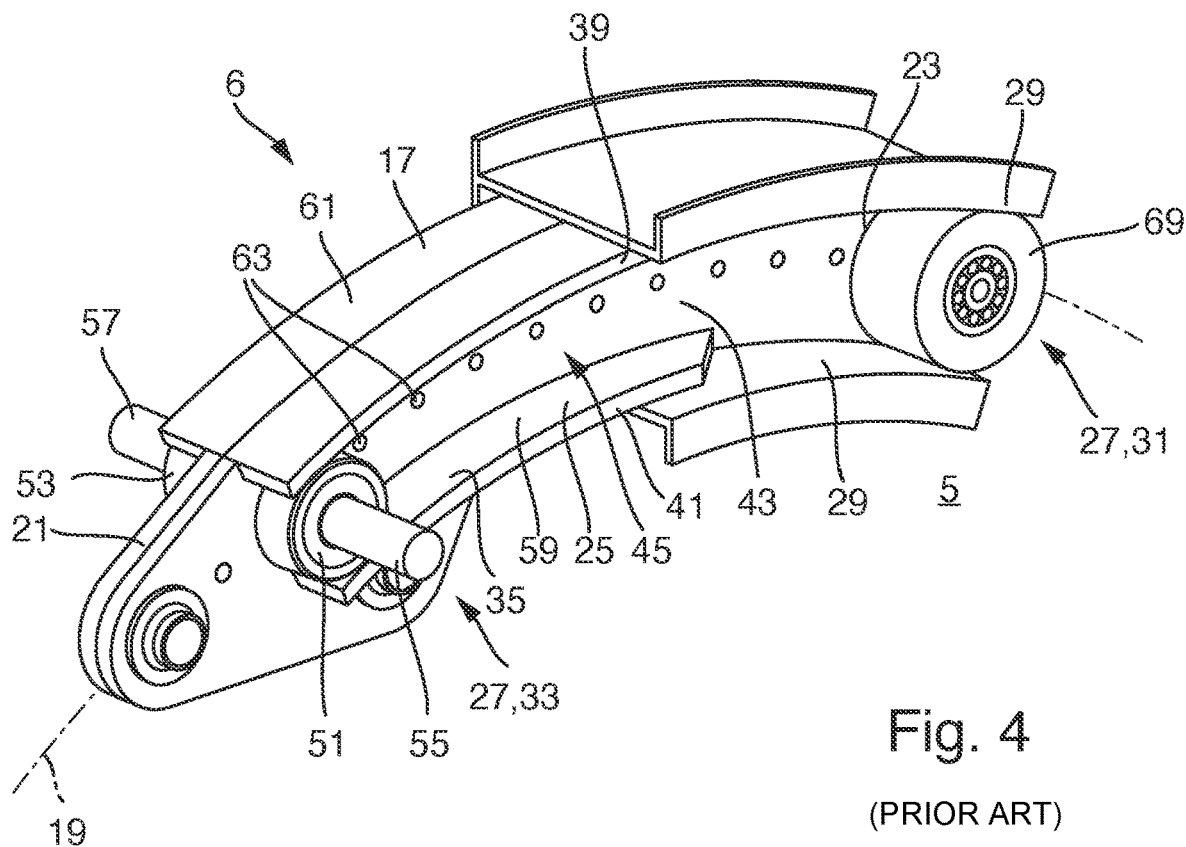
FIG. 4 is a top and side, perspective view of the connection assembly of FIG. 2.
Figure 5:
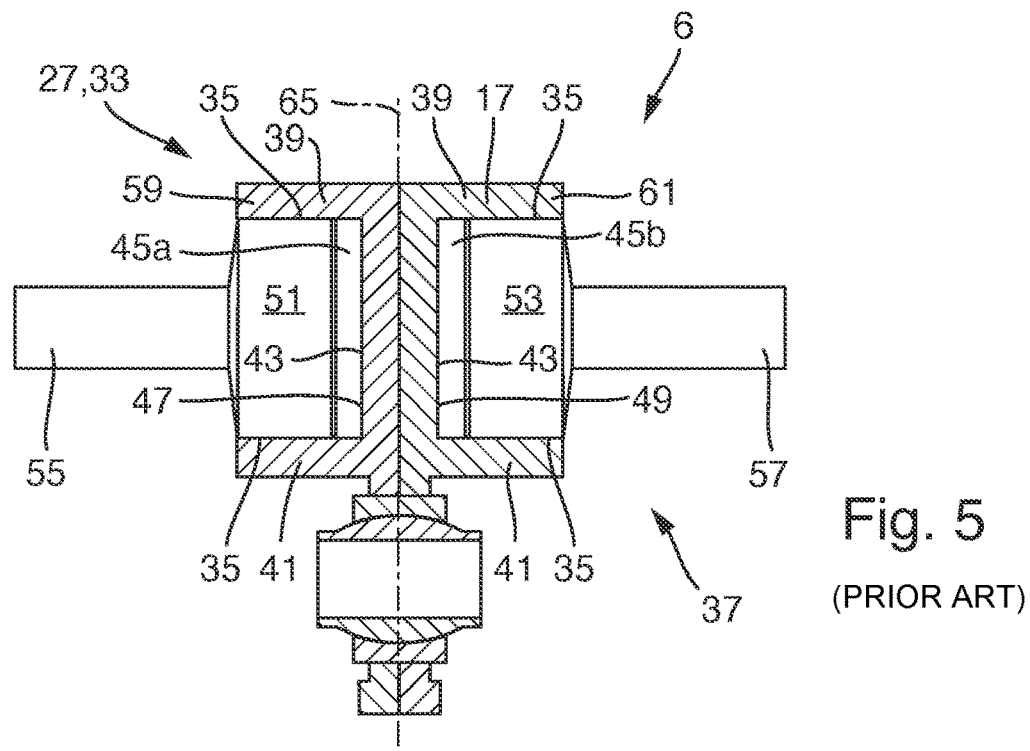
FIG. 5 is a front, partial cutaway view of the connection assembly of FIG. 2.

According to the prior art, the connection assembly 6 comprises a slat track 17 that extends along a track longitudinal axis 19 between a front end 21 and a rear end 23 and has an intermediate portion 25 between the front and rear ends 21, 23. The front end 21 of the slat track 17 is fixedly mounted to the slat 7. The rear end 23 and the intermediate portion 25 of the slat track 17 are movably mounted to the main wing 5 by a roller bearing 27 such that the slat track 17 is movable along the track longitudinal axis 19. The roller bearing 27 comprises a guide rail 29 fixedly mounted to the main wing 5 and a first roller unit 31 fixedly mounted to the rear end 23 of the slat track 17 and engaging the guide rail 29. The roller bearing 27 comprises a second roller unit 33 that is fixedly mounted to the main wing 5 and that engages an engagement surface 35 provided at the intermediate portion 25 of the slat track 17. As shown in FIGS. 3-5, the slat track 17 has a profile 37 comprising an upper flange portion 39, a lower flange portion 41 and at least one web portion 43 connecting upper and lower flange portions 39, 41. The second roller unit 33 is arranged in a recess 45 between upper and lower flange portions 39, 41 and engages the engagement surface 35 provided at the upper flange portion 39 and at the lower flange portion 41.

As shown in FIGS. 4 and 5, the profile 37 of the slat track 17 provides a first recess 45a formed between the upper and lower flange portions 39, 41 at a first side 47 of the web portion 43, and a second recess 45b formed between the upper and lower flange portions 39, 41 at a second side 49 of the web portion 43 opposite the first side 47. The second roller unit 33 comprises a first roller element 51 and a second roller element 53. The first roller element 51 is arranged in the first recess 45a and the second roller element 53 is arranged in the second recess 45b. First and second roller elements 51, 53 are arranged coaxially and have the same radius. The first roller element 51 is mounted on a first shaft 55 and the second roller element 53 is mounted on a second shaft 57 separate from the first shaft 55. First and second shafts 55, 57 are independently supported at the main wing 5.

FIGS. 3-5 show that the slat track 17 comprises a first track part 59 and a second track part 61 that are formed separate from one another. Each of the first and second track parts 59, 61 is formed integrally and extends along the track longitudinal axis 19 from the rear end 23 to the front end 21. The first and second track parts 59, 61 are mounted to one another by bolts 63 and rest against one another along a contact plane 65 spanned by the track longitudinal axis 19 and a wing thickness direction 67. As visible in FIG. 3, the first roller unit 31 comprises a third roller element 69 and a fourth roller element 71. Third and fourth roller elements 69, 71 are arranged coaxially and have the same radius. The third roller element 69 is mounted to the first track part 59 and the fourth roller element 71 is mounted to the second track part 61.

Figure 6:
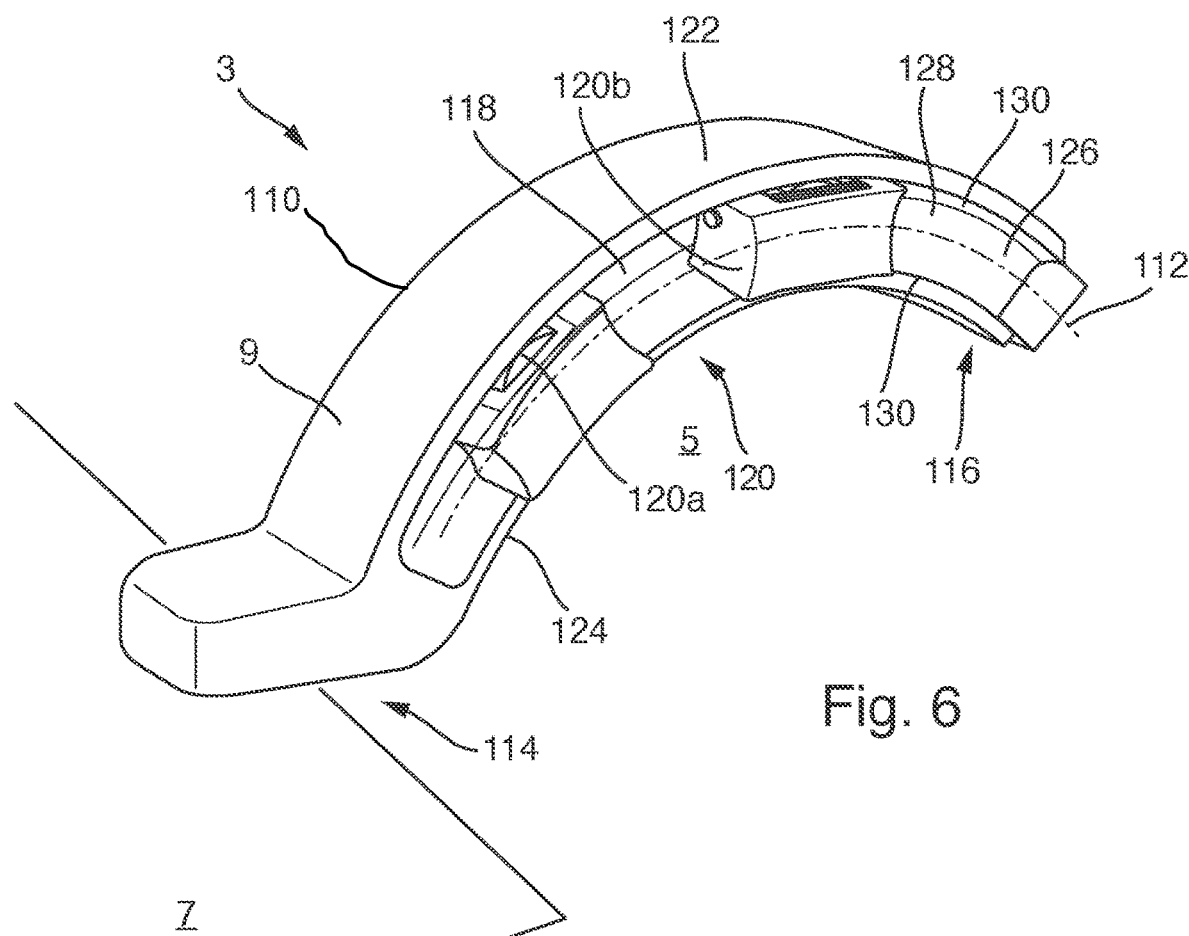
FIG. 6 is s a top and side, perspective view of a connection assembly according to the present invention.
Figure 7:
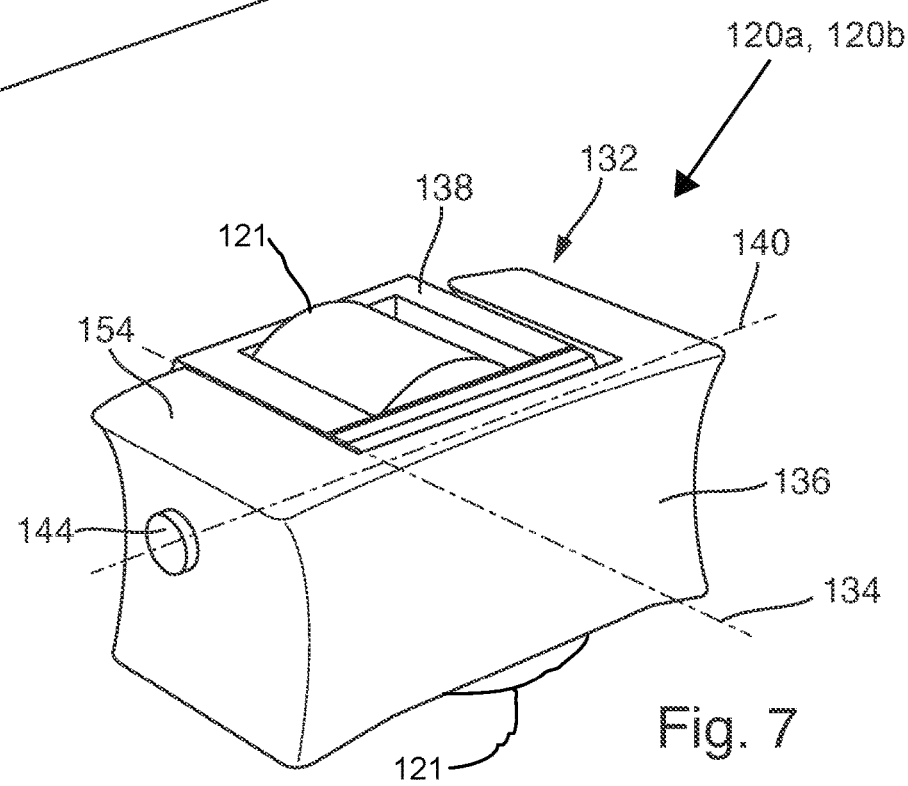
FIG. 7 is a roller unit of the connection assembly of FIG. 6, illustrated in further detail; and, FIG. 8 is a cardanic frame assembly of the roller unit of FIG. 7, illustrated in further detail.
Figure 8:
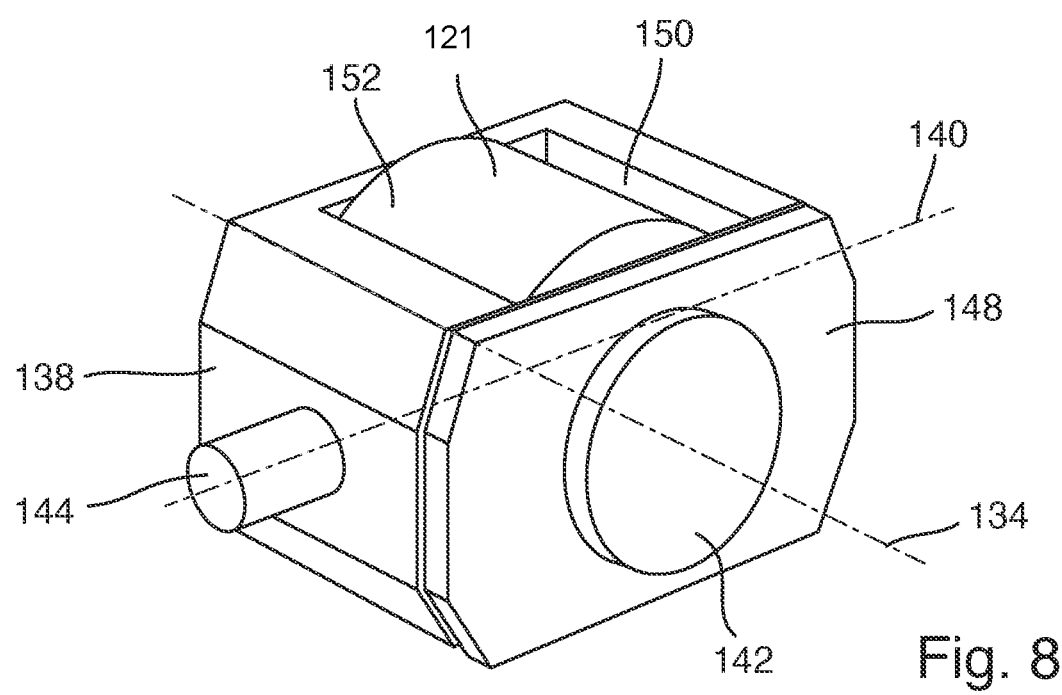

FIGS. 6 to 8 illustrate a wing 3 with a connection assembly 9 according to the present invention. As already illustrated in FIG. 1, the connection assembly 9 may connect a high lift body, such as a trailing edge flap 2 or a leading edge slat 7 to the main wing 5 of an aircraft. The example of FIG. 6 shows the connection assembly 9 as connected to a leading edge slat 7, schematically illustrated in FIG. 6 in relation to the main wing 5.

As illustrated, the connection assembly 9 comprises an elongate track 110 comprising a recess 128 that extends along a track longitudinal axis 112 between a first end 114 and a second end 116 thereof. An intermediate portion 118 is located between the first end 114 and the second end 116. The track 110 has a profile that comprises an upper flange portion 122, a lower flange portion 124 and at least one web portion 126 connecting both of the upper and lower flange portions 122, 124. The upper and lower flange portions 122, 124 are arranged so as to define the recess 128. At least one or both of the upper and lower flange portions 122, 124 comprises an engagement surface 130 for engagement with a roller bearing, as will be described.

Illustrated schematically, in this example the first end 114 is mounted to a high lift body which in this case is a leading edge slat 7 although it should be noted that the high lift body may also be a trailing edge flap 2. The first end 114 of the elongate track 110 is fixedly mounted to the leading edge slat 7 in this example, and may be mounted by any appropriate means. The fixed mounting between the elongate track 110 and the leading edge slat 7 may be such that translational movement between the elongate track 110 and the high lift body is prevented. In an alternative embodiment, the intermediate portion 118 of the elongate track 110 may be mounted to the high lift body (e.g., the leading edge slat 7 or the trailing edge flap 2).

In this example, the elongate track 110 comprises a recess 128 on either side thereof. Here, each recess 128 is disposed on an opposing side of the elongate track 110, on a first and second side of the web portion 126, and there are two recesses 128 located on the illustrated elongate track 110. The two opposing recesses 128 on the elongate track 110 each extend along the track longitudinal axis 112, for example parallel to the track longitudinal axis 112. The elongate track 110 comprises, in this example, a profile (e.g., an axial cross-sectional profile) having an I, Π, double-C or double-T shape, which may assist to provide connection between the high lift body and the wing of an aircraft on both sides of the elongate track 110.

Also illustrated in FIG. 6 is a roller bearing 120. The roller bearing comprises, as illustrated in FIG. 6, a first and a second roller unit 120a, 120b positioned in the recess 128 on one lateral side of the elongate track 110. The first roller unit 120a is spaced from the second roller unit 120b along the track longitudinal axis 112. Although a first and second roller unit 120a, 120b are provided in the example of FIG. 6, it should be noted that in some examples the roller bearing 120 may comprise only one of the illustrated roller units 120a, 120b.

The elongate track 110 comprising a recess 128 on either side thereof may comprise at least one roller unit 120a, 120b comprising a first roller element 121 (e.g., roller) and a second roller element 121, where the first roller element 121 is located in the recess on one side of the elongate track 110 and the second roller element 121 is located in the recess on the other side of the elongate track 110. Preferably, the first and second roller elements 121 are arranged coaxially and have the same radius. In the case where the elongate track 110 comprises a second roller unit 120b spaced from the roller unit along the track longitudinal axis 112, the second roller unit 120b may also comprise two roller elements 121, which may be considered to be a third and a fourth roller element 121, and which may preferably be coaxially arranged and have the same radius.

The roller unit or units 120a, 120b engage an engagement surface 130 that is provided on the elongate track 110, for example on the intermediate portion 118 or the second end 116 of the elongate track 110. For example, a roller surface 152 of the roller element 121 of the roller unit 120a, 120b engages the engagement surface 130. The roller unit or units 120a, 120b of the roller bearing 120 are arranged (e.g. positioned, located, or the like) in the recess 128 between the upper and lower flange portions 122, 124 so as to engage the engagement surface 130, wherein the engagement surface 130 is provided on the upper flange portion 122 or the lower flange portion 124. Engagement of the engagement surface 130 is such that translational movement of the roller bearing 120 relative to the elongate track 110 is enabled, for example in the direction of the track longitudinal axis 112 (e.g., along, or parallel to, the track longitudinal axis 112).

The roller bearing 120 is mounted to the main wing 5 of an aircraft 1 (e.g., fixedly mounted to the main wing of an aircraft 1) so as to enable movement (e.g., translational movement) between the wing 1 and the elongate track 110 e.g., when the roller bearing 120 moves relative to the track 110. In this case, the roller bearing 120 may be mounted to the wing in any appropriate way, for example by bolting, chemical bonding, welding, or the like. The fixed mounting between the main wing 5 and the roller bearing 120 therefore enables movement of the elongate track 110 relative to the main wing 5 via movement between the roller bearing 120 and the elongate track 110 and, since the high lift body is fixedly mounted to the elongate track 110, also between the main wing 5 and the high lift body. This therefore enables the high lift body to be moved between a stowed position in which the high lift body is held in a retracted position (e.g., proximate the main wing 5) and a deployed position in which the high lift body is in a extended position (e.g., distal the main wing 5).

In FIG. 7, a roller unit 120a, 120b of a roller bearing 120 is illustrated in more detail. Here, it is illustrated that the roller unit 120a, 120b is mounted to a cardanic frame assembly 132. The cardanic frame assembly 132 may be or comprise a universal joint, which may permit rotation of the roller unit 120a, 102b in more than one axis, for example in two axes. The cardanic frame assembly 132 comprises a first frame 136 and a second frame 138. The first frame 136 in this example may be considered to be the outer frame, while the second frame 138 may be considered to be the inner frame.

The first frame 136 of the cardanic frame assembly 132 is mounted to the main wing 5, and therefore provides the fixed mounting of the roller unit 120a, 120b to the main wing as previously described. The roller unit 120a, 120b is mounted to the second frame 138 so as to be rotatable about a roller rotation axis 134, and the second frame 138 is mounted to the first frame about a frame rotation axis 140. The frame rotation axis 140 extends perpendicular to the roller rotation axis 134. The cardanic frame assembly 132 therefore enables the roller unit 120a, 102b to rotate about both the roller rotation axis 134 and the frame rotation axis 140, for example in the style of a universal joint. Thus, the roller unit 120a, 120b is able to adapt its position (e.g., its tilt position) relative to the engagement surface 130, for example when engaging with the engagement surface. Stress concentrations on the roller unit 120a, 120b are therefore avoided or diminished by ensuring that the position of the roller unit 120a, 120b relative to the engagement surface is adaptable.

Although not visible in FIG. 7 (but see FIG. 8), a first shaft having an axis of rotation of the roller rotation axis is mounted to the roller unit 120a, 102b (e.g., fixedly mounted to the roller unit) and is rotatably supported by the second frame 138 so as to enable rotation between the roller unit 120a, 102b and the second frame 138 about the roller rotation axis 134. The support 142 between the first shaft and the second frame 138 is illustrated in FIG. 8. Alternatively, the first shaft may instead be mounted (e.g., via a mount 142) to the second frame and rotatably supported by the roller unit 120a, 102b. A second shaft 144 forms the frame rotation axis 140 and is mounted (e.g., fixedly mounted) to the second frame 138 and rotatably supported by the first frame 136 so as to enable rotation between the first and second frames 136, 138. Alternatively, the second shaft may be fixedly mounted to the first frame 136 and rotatably supported by the second frame 138.

At least one of the first frame 136 or the second frame 138 may form a housing around the roller element 121. In the example of FIG. 8, the second frame 138 is illustrated as forming a housing around the roller element 120, such that the housing comprises at least one opening 150.

The roller element 121 is held in a cavity in the second frame 138, onto which a cover 148 is placed. The roller unit 120a, 102b extends through the at least one opening 150 (e.g., one or each of the at least one opening 150), such that a roller surface 152 protrudes through the opening 150. The roller surface 152 protruding through the opening 150 may then engage with at least one, or both, of the engagement surfaces 130 of the track in the area of the opening, as is illustrated in FIG. 6.

Illustrated in FIGS. 7 and 8, the housing (e.g., the second frame 138) has an opening 150 on an upper side thereof. The housing (e.g., the second frame 138) may additionally or alternatively comprise a second opening on a lower side thereof. In this example, the roller surface 152 extends through one, or both, or the openings on the upper and lower side. As such, in this example, the roller surface 152 is able to engage the engagement surface 130 of the upper and/or lower flange portions 122, 124 as illustrated in FIG. 6. This may be achieved by fitting the housing (in this case, second frame 138) in the recess 128 shown in FIG. 6.

The first frame 136 comprises at least one (e.g. one or two) curved outer surfaces 154 configured to be positioned so as to face an engagement surface 130. The number of curved outer surfaces 154 may be the same as the number of openings 150 in the housing. The curved outer surfaces 154 may provide a fail-safe feature, that that if the roller is damaged and/or falls within the housing (e.g., because one of the shafts supporting the roller fails) then the curved surface 154 may continue to allow sliding movement between the first frame 136 and the engagement surface 130. In this case, friction may be further reduced by using a liner (such as a PTFE liner) at the interface between the curved surface 154 and the engagement surface 130, e.g. positioned on at least one of the curved surface 154 an the engagement surface 130.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
   a main wing,
   a high lift body, and
   a connection assembly movably connecting the high lift body to the main wing such that the high lift body is configured to move between a retracted position and at least one extended position,
   wherein the connection assembly comprises an elongate track extending along a track longitudinal axis between a first end and a second end and has an intermediate portion between the first and second ends,
   wherein the first end, the intermediate portion of the track, or both are mounted to the high lift body,
   wherein the second end, the intermediate portion of the track, or both are mounted to the main wing such that the track is configured to move along the track longitudinal axis,
   wherein at least one roller comprises at least one roller engaging an engagement surface provided at the track,
   wherein the at least one roller is configured to adapt a tilt position with respect to the engagement surface,
   wherein the at least one roller unit comprises a first frame and a second frame,
   wherein the second frame is rotatably mounted to the first frame and rotatable about a roller rotation axis, and
   wherein the second frame is further rotatably mounted to the first frame and rotatable about a frame rotation axis extending perpendicular to the roller rotation axis.

2. The wing according to claim 1, wherein a first shaft forming the roller rotation axis extends between the first frame and the second frame such that a first relative rotational movement between the first frame and the second frame is achieved about the roller rotation axis, or
   wherein a second shaft forming the frame rotation axis extends between the first frame and the second frame such that a second relative rotational movement between the first frame and the second frame is achieved about the frame rotation axis, or
   both.

3. The wing according to claim 1, wherein the first frame, the second frame, or both are formed as a housing around the at least one roller,
   wherein the housing has at least one opening, and
   wherein the at least one roller extends through the at least one opening, so that a roller surface of the at least one roller engages with the engagement surface of the track in an area of the at least one opening.

4. The wing according to claim 1, wherein the track has a profile comprising an upper flange portion, a lower flange portion, and at least one web portion connecting the upper flange portion and the lower flange portion,
   wherein the at least one roller unit is arranged in a recess between the upper flange portion and the lower flange portion and engages the engagement surface provided at the upper flange portion, at the lower flange portion, or at both.

5. The wing according to claim 1, wherein the at least one roller unit comprises at least a first roller and a second roller, wherein the second roller is spaced from the first roller along the track longitudinal axis.

6. The wing according to claim 1, wherein the track comprises a profile having a first recess formed between an upper flange portion and a lower flange portion at a first side of a web portion, and
a second recess formed between the upper flange portion and lower flange portion at a second side of the web portion opposite the first side of the web portion.

7. The wing according to claim 6, wherein the at least one roller unit comprises at least a first roller and a second roller,
wherein the first roller is arranged in the first recess and the second roller is arranged in the first recess.

8. The wing according to claim 7, wherein the first roller and the second roller are spaced apart from one another along the track longitudinal axis.

9. The wing according to claim 1, wherein the connection assembly is a first connection assembly, wherein the wing comprises a second connection assembly connecting the high lift body to the main wing in a position spaced apart from the first connection assembly in a wing span direction, and wherein the second connection assembly is formed as the first connection assembly.

10. An aircraft comprising the wing according to claim 1.

* * * * *